(12) United States Patent
Simofi-Ilyes et al.

(10) Patent No.: US 9,859,770 B2
(45) Date of Patent: Jan. 2, 2018

(54) DRIVE UNIT AND METHOD FOR OPERATING THE DRIVE UNIT

(71) Applicant: Brose Fahrzeugteile GmbH & Co. KG, Wurzburg, Wurzburg (DE)

(72) Inventors: Attila Simofi-Ilyes, Clarkston, MI (US); Milenko Stamenic, Unterhaching (DE); Michael Groppel, Flint, MI (US); Richard Illingworth, Clarkston, MI (US)

(73) Assignee: BROSE FAHRZEUGTEILE GMBH & CO. KG, WUERZBURG, Wuerzburg (DE)

( * ) Notice: Subject to any disclaimer, the term of this patent is extended or adjusted under 35 U.S.C. 154(b) by 347 days.

(21) Appl. No.: 13/772,547

(22) Filed: Feb. 21, 2013

(65) Prior Publication Data

US 2014/0232303 A1    Aug. 21, 2014

(51) Int. Cl.
*H02K 7/10* (2006.01)
*H02K 7/102* (2006.01)

(52) U.S. Cl.
CPC ............. *H02K 7/1021* (2013.01); *H02K 7/10* (2013.01)

(58) Field of Classification Search
CPC ............................... H02K 7/1021; H02K 7/10
USPC ........ 318/372; 310/89, 181, 239, 58; 192/14
See application file for complete search history.

(56) References Cited

U.S. PATENT DOCUMENTS

| 3,797,448 A | * | 3/1974 | Cramer | B63H 20/007 318/15 |
| 6,333,577 B1 | * | 12/2001 | Kusumoto | H02K 7/10 310/100 |
| 2004/0144609 A1 | * | 7/2004 | Schneider | F16D 67/06 192/14 |
| 2005/0000762 A1 | * | 1/2005 | Powrozek | B60T 7/107 188/162 |
| 2005/0116554 A1 | * | 6/2005 | Dano | H02K 11/33 310/58 |
| 2007/0049444 A1 | * | 3/2007 | Gumpoltsberger | B60K 6/26 475/5 |
| 2011/0130238 A1 | * | 6/2011 | Schoon | B60K 7/0007 475/154 |

* cited by examiner

*Primary Examiner* — Shawki S Ismail
*Assistant Examiner* — Muhammad S Islam
(74) *Attorney, Agent, or Firm* — Westman, Champlin & Koehler, P.A.

(57) ABSTRACT

A drive unit for operating a device, in particular a device in a vehicle and a method for operating a drive unit are provided. An electrical drive assembly and a break assembly are combined and arranged together in a common housing. The breaking assembly could be a mechanical breaking assembly or an electrical break assembly. The break assembly automatically locks the shaft of the electrical drive assembly and thus provides self-locking capabilities.

14 Claims, 5 Drawing Sheets

DRIVE UNIT AND METHOD FOR OPERATING THE DRIVE UNIT

FIELD OF THE INVENTION

The present invention is directed to a drive unit for actuating devices in a vehicle and a method for operating the drive unit.

BACKGROUND OF THE INVENTION

Modern automobiles comprise a plurality of auxiliary drive units. In particular electrically operated drive units, such as electric motors, are used for transfer case applications, engine cooling fan modules, operating windows, seat parts or other accessories in an automobile. In some applications, the operated device has to remain in the position which has been set up by the drive unit. For example, in transfer case application the electric motor with a holding break provides a torque to shift the transfer case to all required positions over its operating range, and further provides a holding torque required at any specific position. Furthermore, a window or a seat part is locked after the drive unit stops operating. Thus, the position of the window or the seat part cannot be changed by an external force and the respective element will remain in the desired position.

In order to provide locking properties, the electric motor is usually equipped with an additional breaking means. This additional breaking means has to be affixed to a housing of the motor. For this purpose, the motor and the breaking means require additional mounting elements to connect the motor and the breaking means. These additional mounting elements involve additional costs and effort when manufacturing the motor housing and the breaking unit. Further to this, such a device comprising a motor and additional breaking means leads to an overall large-sized.

SUMMARY OF THE INVENTION

Accordingly, there is the need to provide an enhanced drive unit with a break, ensuring a robust and durable drive unit construction and requiring a reduced size of the arrangement.

In accordance with the present invention, a drive unit having the features of claim 1 and a method for operating a drive unit having the features of claim 18 are provided.

According to one aspect, therefore, the invention provides a drive unit for actuating devices in a vehicle, comprising a drive unit housing including an electric drive assembly having a shaft; and a break assembly connected to the shaft of the electric drive assembly.

According to an embodiment, the electric drive assembly and the break assembly are completely arranged in an opening of the drive unit housing, and the opening being sealed by a cover element.

In still another embodiment, the electric drive assembly comprises an AC motor.

In yet another embodiment, the break assembly is a self-locking break assembly.

In a further embodiment, the break assembly comprises a mechanical break assembly.

In a particular embodiment, the mechanical break assembly comprises a spring break.

In another embodiment, the break assembly comprises an electrical break assembly.

In a particular embodiment, the electrical break assembly further comprises a coil magnet.

In another embodiment, a bearing is nested in a same housing as the coil magnet.

In yet another embodiment, the electrical break assembly further comprises a friction disk and a clutch plate, wherein the friction disk is locked between the clutch plate and one portion of the drive unit housing.

In a particular embodiment, a clutch plate is an integrally part of the drive unit housing.

In a further embodiment, the friction disk is engaged with a shaft region of the shaft, and the shaft region is grooved or has a D shaped, a double D shaped or an octagonal shape.

In yet another embodiment, the break assembly is arranged in a break housing.

In a particular preferred embodiment, the break housing is pressed into the drive unit housing.

In another particular embodiment, the break housing is welded to the drive unit housing.

In another embodiment, the electric drive assembly comprises a DC motor.

According to a further aspect, the invention provides a method for operating a drive unit comprising the steps of: providing a drive unit having a drive unit housing including an electric drive assembly having shaft and including a break assembly connected to the shaft of the electric drive assembly; rotating the shaft by said electric drive assembly; stopping the rotation of the shaft; and locking the shaft by said break assembly when the electric drive assembly has stopped the rotation of the shaft.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

Skilled artisans will appreciate that elements in the figures are illustrated for simplicity and clarity and are not necessarily drawn to scale. That is, the chosen elements are illustrated to enhance an understanding of the functionality and arrangement of features in the various embodiments. Common and well understood elements that may be useful or necessary in a commercially feasible embodiment are not necessarily depicted in order to facilitate a less abstracted view of the embodiments. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as it accorded to such terms and expressions with respect to their corresponding respective areas of inquiry and study, except where specific meanings have otherwise be set forth herein.

In all figures of the drawings elements, features and signals which are the same or at least have the same functionality have been provided with the same reference symbols, unless explicitly stated otherwise.

DETAILED DESCRIPTION OF PREFERRED EMBODIMENTS

Figure 1:
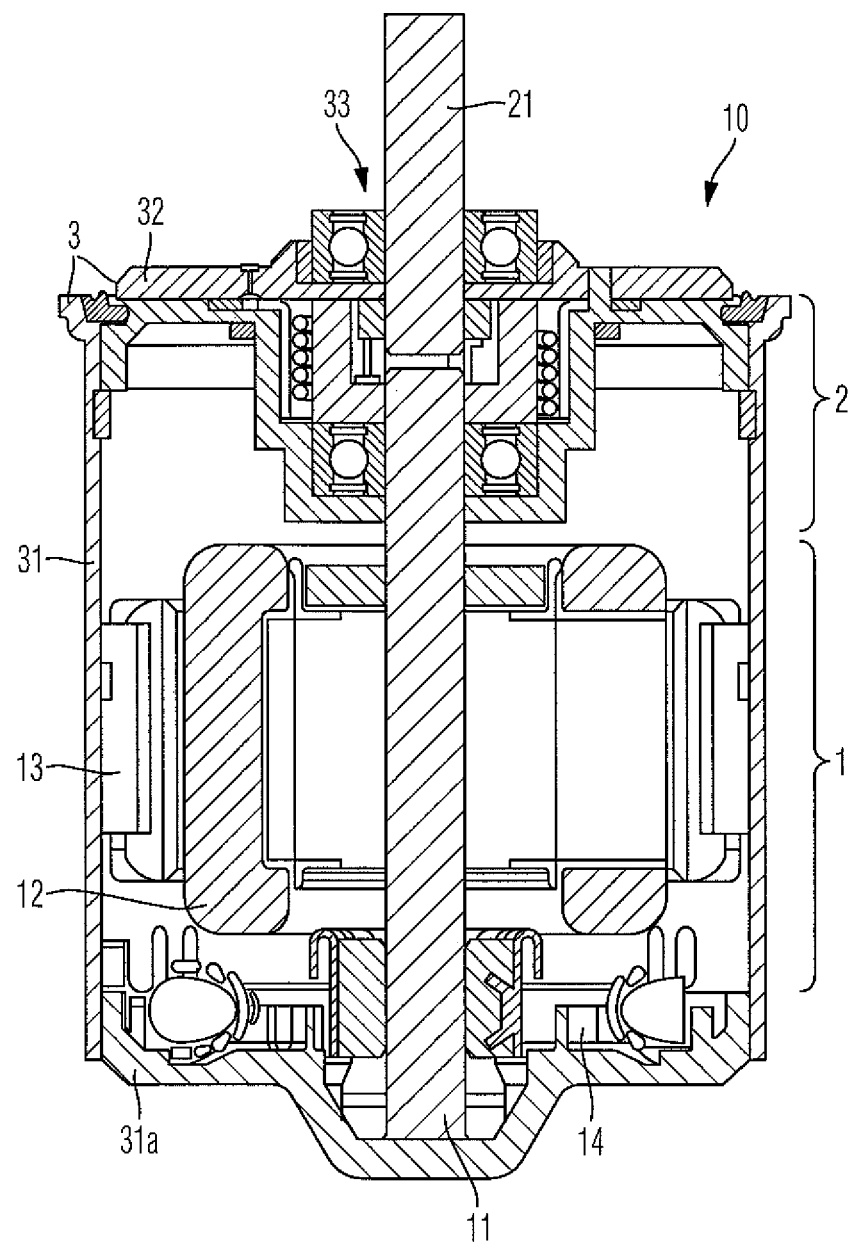
FIG. 1 shows a cross-sectional view of a drive unit according to an embodiment of the invention.

With reference firstly to FIG. 1 of the drawings, a drive unit 10 for driving a powered vehicle window or for adjusting a seat part is shown. The drive unit 10 comprises an electric drive assembly 1 and a break assembly 2. The electric drive assembly 1 further comprises a rotor 12 as well as a stator assembly. The stator assembly in this configuration comprises metallic housing 31 and at least one permanent magnet 7. The metallic housing 31 is made of magnetic flux conductive material. The at least one magnet 7 is fastened to housing 31 by means of adhesive of clips 13. The rotor 12 is mounted on shaft 11 to rotate about an axis. The electric drive assembly 1 is further connected to the power by means of a brush card 14, which is arranged at the bottom of the electrical drive assembly 1.

Alternatively, other types of motors for an electric drive assembly 1 are also possible. For example the electric drive assembly 1 may be an electrically of electromagnetically induced motor type. All kinds of brushed or brushless AC or DC motors are possible.

In particular, if the electric drive assembly is an inner rotor brushless motor or an induction motor, a wound stator is used instead of permanent magnets 7.

For example, the electric drive assembly comprises a DC-Motor, in particular a brushed DC-motor. DC-motors are very common for operating peripheral elements in a vehicle. Further to this, DC-motors, in particular brushed DC-motors can be build as very small motors. Such a type of a motor can be very easily combined with a breaking assembly as described later and arranged together in a common housing. However, other electric motors are also possible.

Shaft 11 is connected to the break assembly 2, which is arranged above the electric drive assembly 1. The electric drive assembly 1 and the break assembly 2 are both arranged inside a drive unit housing 3. In particular, the drive unit housing 3 comprises a drive housing body 31 having an opening for receiving the electric drive assembly 1 as well as the break assembly 2. The break assembly is connected to the shaft 11 of the electric drive assembly 1. The drive housing body 31 may preferably have a generally cylindrically form with opposite flattened sides. Thus, all components of the drive assembly and the break assembly can be easily combined and arranged in a common body.

In one embodiment, the drive housing body 31 is formed in one piece. In this way, a very robust drive housing body can be achieved. Further to this, such a body formed in one piece also provides very good properties with respect to radio frequency interferences.

In an alternative embodiment, the drive housing body 31 is opened at both flattened sides. In this case, the bottom side of the drive housing body 31 has to be closed by an additional part 31a.

In both cases, either when the drive housing body 31 is formed in one piece, or the drive housing body 31 is closed at bottom side by further element 31a, electrical drive assembly 1 and break assembly 2 are completely integrated into drive unit housing 3 and drive housing body 31 is closed at the top side by an additional cover element 32. This cover element 32 has a small opening 33 for external shaft 21. By sealing the opening of the body after the drive assembly and the break assembly are inserted, it is possible to enable a quick and easy assembling of the drive unit.

Figure 2:
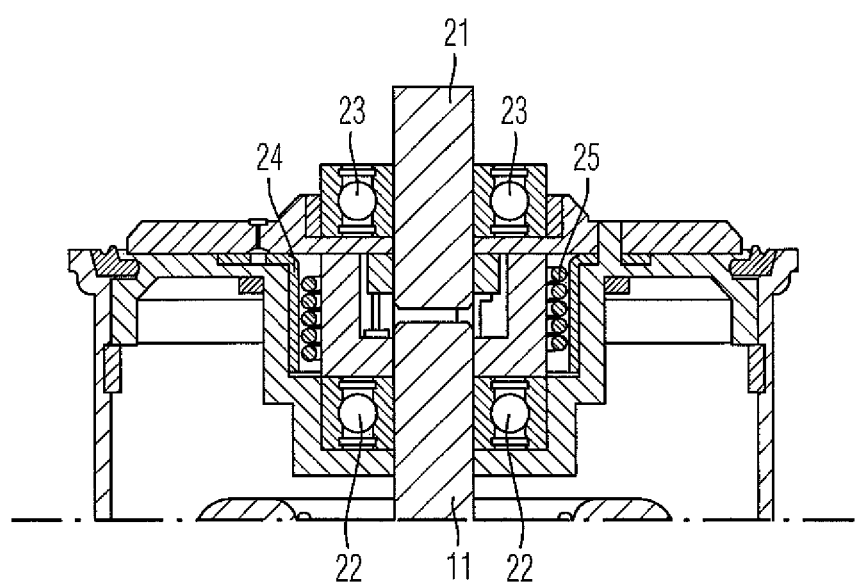
FIG. 2 shows a cross-sectional view of a break assembly according to another embodiment of the invention.

Referring to FIG. 2, break assembly formed as a mechanical break assembly 2 is shown in more detail. By combining the drive assembly with a mechanical break assembly, no further electrical wires and connections are required for locking the shaft. Additionally, it is not necessary to generate and provide additional electronic control signals to the break assembly in order to lock the shaft.

Break assembly 2 is connected to motor shaft 11. In order to provide concentricity of the motor shaft 11, motor shaft 11 is supported by first bearings 22. Break assembly 2 is configured as a spring break comprising friction cap 24 and torsion spring 25. Operation of the drive unit is output to an external device via application shaft 21 which is supported by second bearing 23.

When the drive unit is switched on, i.e. the electric drive assembly 1 is provided with energy, motor shaft 11 is rotated by electrical drive assembly 1. At the same time, break assembly 2 is loosened and thus, application shaft 21 is also rotated by the drive assembly 1.

When the electric drive assembly 1 is stopped and motor shaft 11 is no longer rotated, break assembly 2 locks application shaft 21. Accordingly, it is not possible to rotate application shaft 21 by, an external force. In this way, application shaft 21 is automatically locked by a mechanical break assembly 2 when the electrical drive assembly 1 stops rotating. Thus, a self-locking break assembly 2 is achieved. By providing such a self-locking capability, the shaft of the electric drive assembly is locked in an arbitrary position after the electric drive assembly stops driving. In this way, no further operations are required in order to lock the shaft of the drive unit after the drive unit has moved a connected device to a predetermined position.

Figure 3:
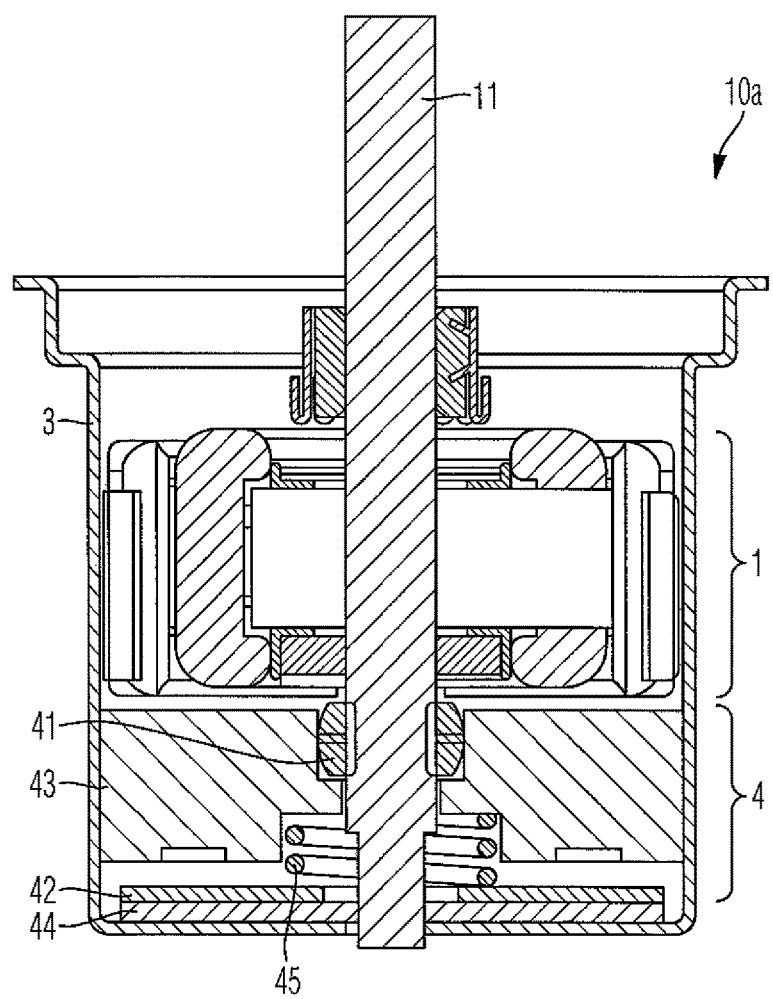
FIG. 3 shows a cross-sectional view of a drive unit according to further embodiment of the invention.

With reference to FIG. 3 of the drawings, a further embodiment of the drive unit 10a is illustrated. In this case, an electrical break 4 is arranged at the bottom of the drive unit housing 3. Further to this, an electric drive assembly 1 is also included into the drive unit housing 3. The electric drive assembly 1 in this embodiment may be similar to the electric drive assembly 1 in the previously described embodiment.

Since it is already necessary to provide an electric connection for controlling the electric drive assembly, a control of an electrical break assembly and the respective connections can be very easy achieved, when the break assembly and the drive assembly are combined together in a common housing. In this case, only one electrical interface providing an interface for both, the electrical break assembly and the drive assembly is required. Thus, the drive unit can be further simplified and the costs for manufacturing such a drive unit can be reduced.

The electrical break assembly 4 in this embodiment is completely integrated in the drive unit housing 3, too. Motor shaft 11 at the electrical break side is supported by bearing 41. Bearing 41 may be a bearing/bushing (sleeve bearing) or a ball bearing that is nested into housing 6.

Figure 4:
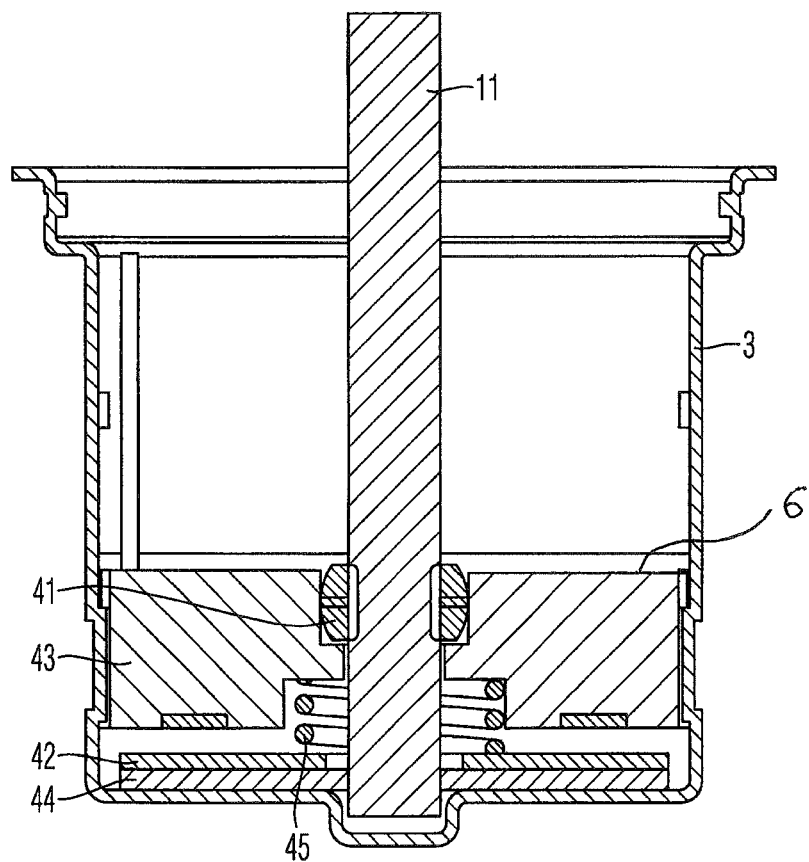
FIG. 4 shows a cross-sectional view of a break assembly according to still another embodiment of the invention.

With reference to FIG. 4, the electric break assembly 4 is described in more detail. Electrical break assembly 4 comprises coil magnet 43 and clutch plate 42. Preferably, clutch plate 42 is a metallic clutch. When power is provided to the coil magnet 43, coil magnet 43 opens clutch 42. Thus, friction disc 44 is loosened and shaft 11 can be rotated. When coil magnet 43 is switched off, clutch plate 42 is closed by means of spring 45 and thus, the break 4 locks friction disc 44. Thereby, friction disk 44 is locked between clutch plate 42 and the lower part 3a of the motor housing. In particular, lower part 3a is an integral part of the motor housing forming a clutch plate. Accordingly, motor shaft 11 is also locked.

Further, housing 6 encapsulates coil magnet 43. Shaft 11 at region 11a needs to engage with friction disk 44 without slippage. For this purpose, section 11a of shaft 11 can be shaped as octagonal, D shape, double D shape or may be grooved, to match and engage with the corresponding shape in the center of friction disk 44.

Electrical break assembly 4 may be controlled by the same voltage as applied to the electrical drive assembly 1. In this case, no further electrical signals have to be generated and provided to the drive unit 10a. In particular, the same voltage applied to the drive assembly 1 can be applied to the electrical break assembly 4, too. Thus, the electrical break assembly 4, integrated in the drive unit housing 3, can be controlled without the need of any additional signals. In this way, no additional terminals for providing control signals to the electrical break 4 assembly are required.

In order to distribute the electrical signals to the electrical drive assembly and to the electrical break assembly, an additional device can be implemented. This additional device may comprise a circuit for preparing the electrical signals and performing a correct timing when providing the signals to the electrical drive assembly and the electrical breaking assembly 4. For example, electrical power should be conveyed to the electrical break assembly 4 before to the electrical drive assembly 1. In this way, a high inrush current can be avoided when starting the electrical drive assembly 1. Further, power is turned off from the electrical drive assembly 1 before the electrical break assembly 4 locks the drive unit. In this way a high load and wear of the friction disk 44 can be avoided. The duration time delay for power conveying to the electrical assemblies is optimized to ensure smooth operation to the drive unit.

According to a further embodiment, the electrical break assembly 4 is arranged in an additional break housing. Accordingly, all elements of the break assembly 4 are arranged in a common housing. Thus, the break assembly is protected from external pollution or other influences. Additionally, a break assembly 4 in separate break housing can be easily prepared in advance. Thus, the assembling of the drive unit can be simplified.

Preferably, the outer diameter of the break housing almost corresponds to the inner diameter of the drive unit housing 3. Thus, the break housing is pressed into the drive unit housing 3. Thus, a prepared break assembly in a break housing can be easily mounted in the common drive unit housing 3. By pressing the break housing including a break assembly into the drive unit housing, the break assembly remains in a fixed position, and the motor shaft can be securely locked by the break assembly. In this way a reliable connection between break housing and drive unit housing 3 is achieved. In order to further enhance this connection, a relief structure is provided on the outer surface of the break housing and/or to the inner surface of the drive unit housing.

Alternatively, it is also possible to connect the break housing to the drive unit housing by a welding process. For this purpose, the break housing is inserted into the drive unit housing 3 and subsequently, the break housing is welded to the drive unit, for instance, using a high current welding process. By welding the break assembly, in particular the break housing, to the drive unit housing, a very reliable connection between drive unit housing and break housing is achieved. In this way, the locking forces can be applied very reliable to the shaft of the drive unit.

With a drive unit according to the present invention, the dimensions of a drive unit can be reduced. By combining the electric drive assembly for driving the shaft and the breaking assembly for locking the shaft and arranging both together in a common drive unit housing, a compact drive unit can be achieved.

Since all components are arranged in a common housing, it is not necessary to connect two separate components, a first component for providing the driving capabilities, and a second component for providing the locking capabilities. In this way, the common arrangement can be simplified. Only a single terminal for connecting all wires is required. Thus, the costs for manufacturing such a drive unit are reduced. Additionally, since all components are arranged in the drive unit housing, the radio frequency interferences (EMC) of the complete arrangement are reduced, as all components are integrated in the well absorbing drive unit housing.

Figure 5:
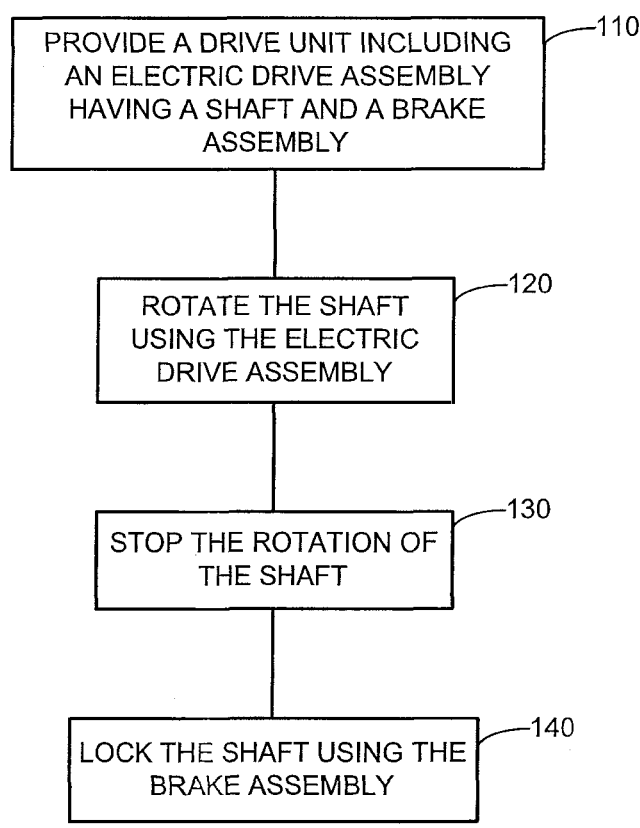
FIG. 5 shows a flow diagram of a method for operating a drive unit according to a further embodiment of the invention.

With reference to FIG. 5 of the drawings, a method for operating a drive unit is shown. In a first step 110 a drive unit having a drive unit housing including an electric drive assembly with a shaft and a break assembly connected to the shaft of the electric drive assembly is provided. Next, in step 120 the shaft is rotated by the electric drive assembly. Further, in step 130 the rotating of the shaft is stopped. Finally in step 140 the shaft is locked by the break assembly when the electric drive assembly stops driving the shaft.

Summarizing, the present invention relates to a drive unit for operating a device, in particular a device in a vehicle and to a method for operating a drive unit. An electrical drive assembly and a break assembly are combined and arranged together in a common housing. The breaking assembly could be a mechanical breaking assembly or an electrical break assembly. The break assembly automatically locks the shaft of the electrical drive assembly and thus provides self-locking capabilities.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system, described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

LIST OF REFERENCE NUMERALS 1 electric drive assembly
2 mechanical break assembly
3 drive unit housing
4 electric break assembly
6 housing
7 permanent magnet
10 drive unit
11 motor shaft
12 rotor
13 spring/clip
14 brush card
21 application shaft
22 first bearing
23 second bearing
24 friction cap
25 torsion spring
31 drive housing body
31a drive housing bottom
32 cover element
33 opening
41 bushing
42 clutch
43 magnetic coil
44 friction disc
45 spring

The invention claimed is:

1. A drive unit for actuating devices in a vehicle, comprising:
 a drive unit housing including an electric drive assembly having a shaft and a brake assembly connected to the shaft of the electric drive assembly,
 wherein the electric drive assembly included in the drive unit housing comprising a rotor and a stator assembly,
 wherein the electric drive assembly and the brake assembly are both arranged inside the drive unit housing, wherein the brake assembly being a self-locking brake assembly, and the brake assembly locks the shaft when the electric drive is stopped and the shaft is no longer rotated,
 wherein the self-locking brake assembly comprises an electrical brake assembly, and
 wherein the drive unit further comprises a single electrical interface providing an interface for the electric drive unit and the self-locking brake assembly.

2. The drive unit according to claim 1, wherein the electric drive assembly and the brake assembly being completely arranged in an opening of the drive unit housing, and the opening being sealed by a cover element.

3. The drive unit according to claim 1, wherein the electrical brake assembly further comprises a coil magnet.

4. The drive unit according to claim 1, wherein the electrical brake assembly further comprises a friction disk and a clutch plate, and wherein the friction disk is locked between the clutch plate and one portion of the drive unit housing.

5. The drive unit according to claim 1, wherein the brake assembly is arranged in a brake housing.

6. The drive unit according to claim 1, wherein the electric drive assembly comprises a DC motor.

7. The drive unit according to claim 1, wherein the electric drive assembly comprises an AC motor.

8. The drive unit according to claim 2, wherein the drive housing body is formed in one piece.

9. The drive unit according to claim 3, wherein a bearing is nested in a same housing as the coil magnet.

10. The drive unit according to claim 4, wherein a clutch plate is an integrally part of the drive unit housing.

11. The drive unit according to claim 4, wherein the friction disk is engaged with a shaft region of the shaft, and wherein the shaft region is grooved or has a D shaped, a double D shaped or an octagonal shape.

12. The drive unit according to claim 5, wherein the brake housing is pressed into the drive unit housing.

13. The drive unit according to claim 5, wherein the brake housing is welded to the drive unit housing.

14. A method for operating a drive unit, comprising the steps of:
 providing a drive unit having a drive unit housing including an electric drive assembly having a shaft and including a brake assembly connected to the shaft of the electric drive assembly, wherein the electric drive assembly including the drive unit housing comprises a rotor and a stator assembly, wherein the brake assembly being a self-locking brake assembly, and wherein the electric drive assembly and the brake assembly are both arranged inside the drive unit housing, wherein the self-locking brake assembly comprises an electrical brake assembly, and wherein the drive unit further comprises a single electrical interface providing an interface for the electric drive unit and the self-locking brake assembly;
 rotating the shaft by said electric drive assembly;
 stopping the rotation of the shaft; and
 locking the shaft by said brake assembly when the electric drive assembly has stopped the rotation of the shaft.

* * * * *